United States Patent [19]

Harner et al.

[11] Patent Number: 4,653,981
[45] Date of Patent: Mar. 31, 1987

[54] PROPELLER SYNCHROPHASER

[75] Inventors: Kermit I. Harner, Windsor; Roy W. Schneider, Ellington; Mark L. Harris, Enfield, all of Conn.

[73] Assignee: United Technologies Corporation, Hartford, Conn.

[21] Appl. No.: 781,585

[22] Filed: Sep. 30, 1985

[51] Int. Cl.[4] .................................... B64C 11/50
[52] U.S. Cl. ..................................... 416/34; 416/35
[58] Field of Search ................ 416/34, 27, 35, 33

[56] References Cited

U.S. PATENT DOCUMENTS

| | | | |
|---|---|---|---|
| 2,847,617 | 8/1958 | Clark | 416/34 X |
| 2,877,854 | 3/1959 | Brahm | 416/34 |
| 2,878,426 | 3/1959 | Preli et al. | 416/34 X |
| 2,887,621 | 5/1959 | Wilde | 416/34 X |
| 2,979,135 | 4/1961 | McDonald et al. | 416/35 |
| 2,986,223 | 5/1961 | McDonald | 416/35 |
| 3,007,529 | 11/1961 | Brockert et al. | 416/34 |
| 3,079,531 | 2/1963 | Tugwood | 416/34 X |
| 3,479,822 | 11/1969 | Nelson et al. | 416/30 X |
| 3,689,175 | 9/1972 | Hartzell et al. | 416/34 |
| 4,245,955 | 1/1981 | Lambertson | 416/34 |

*Primary Examiner*—Everette A. Powell, Jr.
*Attorney, Agent, or Firm*—Francis J. Maguire, Jr.

[57] ABSTRACT

An improved slave propeller synchrophaser (10) includes a first control (14) responsive to a phase difference signal (28) and a phase difference reference signal (26) for providing a phase error signal (112) and for providing a propeller speed reference bias signal (40) for a speed governor (46), and also includes, according to the present invention, a second control (12) responsive to the phase error signal (112) for providing an engine power reference bias signal (80) for an engine power control for providing a very limited amount of propeller fine speed control within the dead band of the propeller speed governor while at the same time substantially maintaining engine power at the commanded power level.

7 Claims, 3 Drawing Figures

PROPELLER SYNCHROPHASER

CROSS REFERENCE TO RELATED APPLICATION

The invention described herein may employ some of the teachings disclosed and claimed in a commonly owned copending application filed on even date herewith by Schneider et al., entitled INTEGRAL CONTROL OF AT LEAST TWO INDEPENDENT VARIABLES FOR CONTROLLING A DEPENDENT VARIABLE, which is hereby expressly incorporated by reference.

TECHNICAL FIELD

This invention relates to multiple propeller/prop-fan propulsion systems, and particularly to synchrophasers for maintaining a selected phase relation between the propellers.

BACKGROUND ART

Aircraft utilizing multiple propeller/prop-fan propulsion systems are faced with an acoustic noise and vibration problem induced by each of the individual propellers acting independently and creating airflow disturbances which interact randomly with one another and impinge on the aircraft fuselage with varying intensities over time. The known synchrophasing art involves designating one propeller as the master and the remaining propellers as slaves and attempting to make each slave maintain a precise angular relationship with respect to the position of the master in order to provide optimum noise and vibration cancellation. The best combination of propeller phase relations normally is established by flight testing.

Known synchrophasers adjust a slave propeller's blade angle pitch and hence the propeller's speed to maintain the proper phase relations. Engine power is maintained constant in all engines. If a slave starts to advance or get ahead of the master its pitch is increased in order to increase its power absorption. But since power is maintained constant its speed drops off instead. In this way adjustable pitch can be used to maintain phase by controlling speed. A problem with this approach is that the amount of speed change and hence the amount of blade movement actually needed to restore an advancing or retarding slave propeller is miniscule. Unfortunately, for small pitch change command signals the typical speed governor is nonresponsive. Small signal non-linearities such as hysteresis and dead zone are inherent in propeller pitch change systems. Thus, for example, an advancing or retarding slave blade will continue to advance or fall behind the master until the magnitude of the error signal is large enough to get out of the dead band of the governor. The basic problem is that the pitch control system is a high power servo not responsive to small amplitude command signals. And the consequence is that the phase error continues to grow until it gets the blade angle to move. Once the blade responds it continues past the desired point through its dead zone and just keeps going an equal amount in the other direction until the phase error once again grows large enough to exit the dead band, albeit on the other side. This is the well-known phenomenon called "limit cycling," i.e., the inability to hold the phase angle accurately because of the inability to overcome the servo's hysteresis with small command signals.

The prior art attempts to address this problem by adding "dither" to the pitch change actuator command signal. The frequency of the superimposed dither signal is high relative to the frequency response of the system and the result is that the dead band is narrowed to a considerable extent. For example, a synchrophaser which has the capability of correcting changes at the rate of 1/6 cycle per second might have a 2½ hertz dither signal superimposed. The dither action imposes an artifical command signal excursion outside the dead band in response to which the system is continually attempting, unsuccessfully, to keep up. However, the system's lack of success in fully following the amplitude of the fast dither commands has a side benefit in keeping the blade actuator "moving" about an average command signal level. This has the effect of narrowing the width of the dead band. A synchrophaser in which the phase error might grow to as much as 12° without any dither is improved to only 3° with dither. A shortcoming of the dither approach, however, is that in asking the blade angle to be moving almost continuously, back and forth, a high degree of wear on seals and other loaded surfaces in the actuator results.

DISCLOSURE OF THE INVENTION

The object of the present invention is to provide an improved propeller synchrophaser which substantially increases the accuracy of the maintained phase relation between master and slave propellers in a multiple propeller aircraft while at the same time eliminating any abnormal actuator wear problems experienced in the prior art.

According to the present invention, an additional slave propeller engine power control path is added in parallel to the prior art slave propeller pitch angle control path which formerly alone controlled slave propeller speed, which additional parallel path controls engine power to a limited extent, i.e., only in the area corresponding to the small hysteresis region of the propeller pitch angle control path where small command signals result in no speed change response and where the propeller pitch angle control path is ineffective. The engine power change signal is very small and does not result in any substantial change in engine power so that all engines may continue to be maintained essentially at equal power. Thus, if phase begins to creep up or down with respect to the master, an ineffectual small signal pitch change command will result and will be replaced, but only to a very limited degree above or below the current engine power operating level, with a incremental change to the bias of the engine power reference signal which in turn effects the desired propeller speed change and phase correction. According further to the present invention, fuel flow modulation is the ideal means of incrementally controlling engine power and thereby improving phase holding ability since it bypasses the nonlinearities of the propeller pitch change system. An electro-hydromechanical fuel control system design inherently possess small signal nonlinearities such as hysteresis. However, due to high frequency fuel system noise, the non-linearities are essentially "averaged-out" of the control. This high frequency noise allows the fuel system to function as a nearly linear system.

In further accord with the present invention, the improved synchrophaser includes a prior art speed bias control which provides a bias signal for superimposing biasing onto the speed governor's speed reference signal. The speed bias control responds to a phase error signal equal to the difference between a phase difference reference signal and a sensed phase difference signal proportional to the phase difference between the master and slave propellers. In further accord with the present invention, the speed bias control path may utilize proportional plus bounded integral control. In still further accord with the present invention, the speed bias control path may have its response enhanced by adding to its output bias signal the magnitude of a signal indicative of the rate at which a sensed speed difference between the master and slave propellers is changing. The magnitude of the resulting output bias signal is bounded to limit the bias authority of the output bias signal.

In still further accord with the present invention, the engine bias control path uses proportional plus integral control responsive to the same phase error signal to which the speed bias control path is responsive, for providing an engine power bias signal for superimposing biasing onto a power reference signal for the slave propeller's engine power controller. The magnitude of the engine power bias signal is limited by subjecting the integrated phase error signal to a hysteresis transfer function and subtracting the resulting signal from the integrated phase error signal. This results in a limited engine power bias signal having magnitude boundaries about the specific operating point of the integrated referenced phase error signal. The magnitudes of both the speed bias signal and engine power bias signal are bounded to provide limited synchrophaser authority so that any malfunction within the synchrophaser cannot cause a large change in either propeller speed or engine power. In further accord with the present invention, a signal having a magnitude proportional to the difference between the speeds of the master and the slave is added to the engine bias signal to enhance the engine power speed of response within the propeller speed control dead band.

Various engine power controls exist in the prior art. As examples, a free turbine engine often utilizes a gas generator speed control as an engine power control, whereas a turbo shaft engine often utilizes engine fuel flow divided by engine inlet pressure as an engine power control. Consequently, various forms of engine power bias signals exist. The engine power bias signal in this disclosure refers to any engine control bias that influences engine power.

The hybrid synchrophaser concept of the present invention uses the fuel control system to bypass the propeller control nonlinearities which cause phase error limit cycling. Whereas the prior art technique of dither only reduced the phase error to about 3° or thereabouts, the phase error may be reduced to less than 1°, according to the present invention. The phase holding accuracy, although dependent upon fuel system hysteresis and fuel system noise, provides a superior reduction of phase error over the prior art including the elimination of the continuous wear on the propeller pitch control actuators due to the electronic dither.

The foregoing and other objects, features and advantages of the present invention will become more apparent in the light of the following detailed description of the preferred embodiments thereof as illustrated in the accompanying drawing.

BEST MODE FOR CARRYING OUT THE INVENTION

Figure 1:
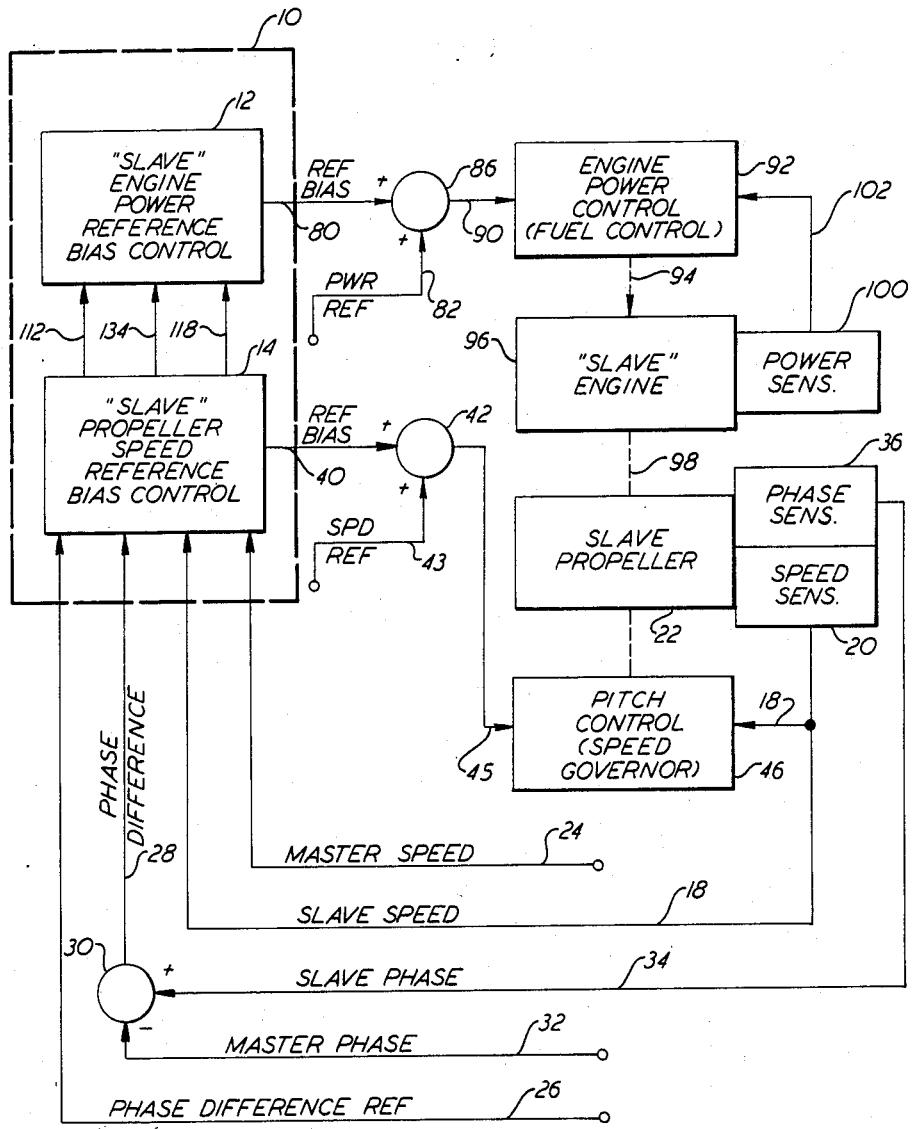
FIG. 1 is a block diagram illustration of an improved propeller synchrophaser, according to the present invention, and includes propulsion system components which define the environment within which the synchrophaser of the present invention may be used.

FIG. 1 is a block diagram illustration of an improved propeller synchrophaser 10, according to the present invention. It includes a "slave" propeller engine power reference bias control 12 and a "slave" propeller speed reference bias control 14. The speed reference bias control 14 is similar to a prior art speed reference bias control 16 illustrated in FIG. 2. Referring back to FIG. 1, the speed reference bias control 14 is responsive to a sensed slave propeller speed signal on a line 18 from a speed sensor 20 which senses a slave propeller 22 speed. The speed reference bias control 14 is also responsive to a master propeller sensed speed signal on a line 24 from a speed sensor (not shown) associated with a master propeller (not shown). The difference between these two sensed speeds is taken within the speed reference bias control and the resulting difference signal is then used for derivative control to improve responsiveness. Of course, it will be understood that the subtraction could be done outside the synchrophaser. Indeed, it should be understood that the essence of the present invention does not depend on the presence or absence of these two signals and they may therefore be omitted without taking away from the basic teachings disclosed.

The speed reference bias control 14 is also responsive to a phase difference reference signal on a line 26 which is indicative of a desired phase difference between the master and slave propeller. This reference signal is compared to a phase difference signal on a line 28 derived from a summing junction 30 which subtracts a master propeller sensed phase signal magnitude on a line 32 from a slave propeller sensed phase signal magnitude on a line 34. A phase sensor 36 associated with the slave propeller 22 provides the sensed slave phase signal on the line 34. Similarly, a master phase sensor (not shown) associated with the master propeller provides the master sensed phase signal on the line 32.

The speed reference bias control 14 provides a speed reference bias output signal on a line 40 to a summing junction 42 where it is added to a slave speed reference signal on a line 43. The effect of the speed reference bias signal 40 is to bias the speed reference signal on the line 43 which acts to control the pitch of the slave propeller blades by means of a combined signal on a line 45 in order to control the speed of the slave propeller through a pitch control 46.

Figure 2:
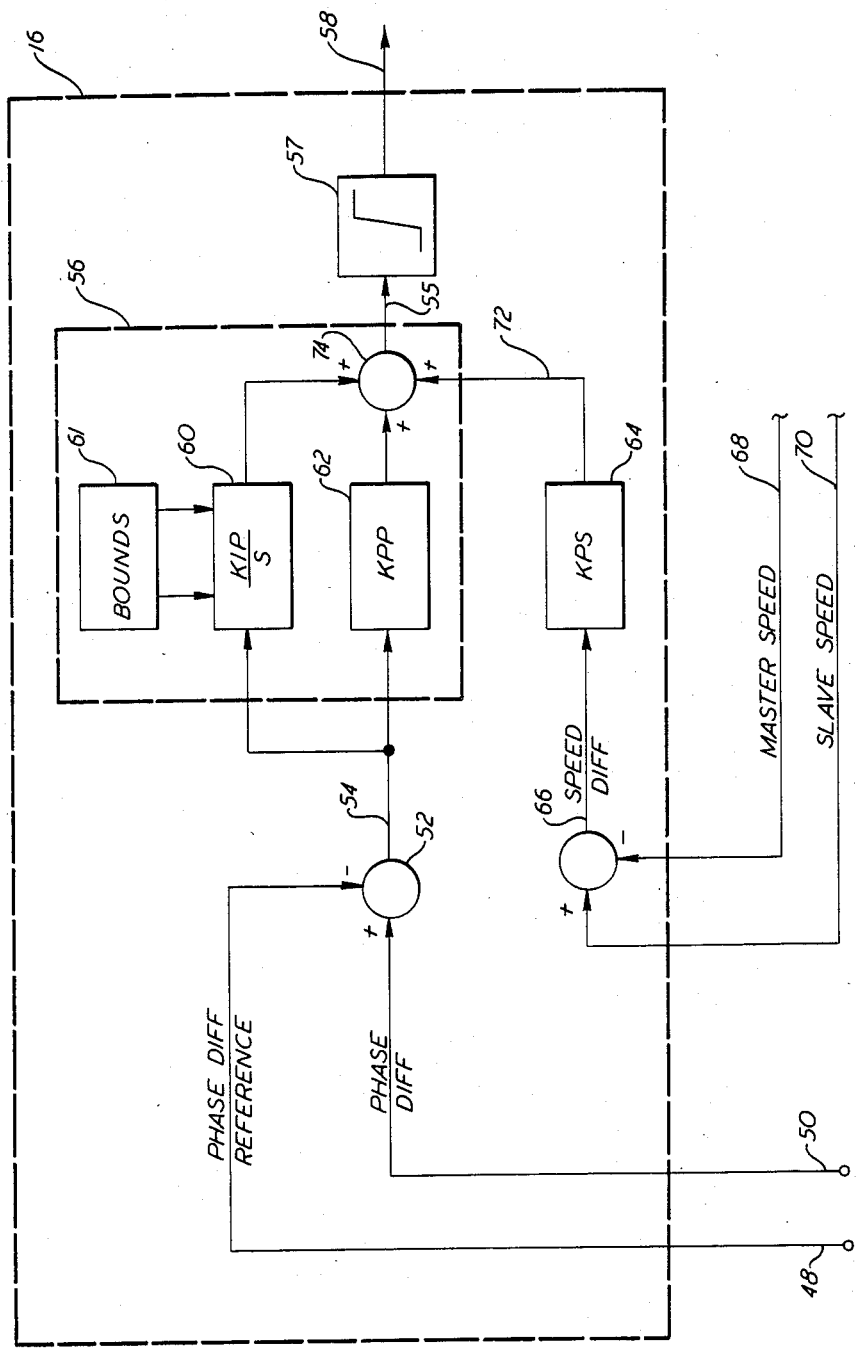
FIG. 2 is an illustration of a prior art propeller synchrophaser.

The operation of the speed reference bias control 14 of FIG. 1, according to the present invention, may be more easily understood in light of the teachings of the prior art as illustrated in the speed reference bias control 16 of FIG. 2. There, a phase difference reference signal on a line 48 is subtracted from a phase difference signal on a line 50 at a junction 52. A resulting phase error signal on a line 54 is provided to a proportional-plusintegral control 56 which provides a signal on a line 55 which is bounded by a limiter 57 to provide a speed reference bias signal on a line 58 similar to the signal on the line 40 shown in FIG. 1. The proportional-plus-integral control 56 includes an integrator 60, integrator bounds 61 and a proportional gain 62. In order for the signal on the line 58 to be dimensionally indicative of angular velocity, i.e., inverse time, the time dimensions of the gains KIP and KPP, of the integrator and proportional gain, respectively, must be inverse time squared and inverse time. In order to increase the responsiveness of the speed reference bias control 16, the prior art provides a differentiator 64 responsive to a speed difference signal on a line 66 which represents the difference in magnitudes between a master sensed speed signal on a line 68 and a slave sensed speed signal on a line 70. The differentiator provides a signal on a line 72 to a summing junction 74 where it is added to the magnitude of the bias signal on the line 55. The signal on the line 72 is indicative of the rate at which the sensed speed difference between the master and slave propeller is changing. This enhances the speed of response of the bias signal on the line 58 to such changes. In order to retain the integrity of the time dimensions previously mentioned with respect to the output signal on the line 58, the gain of the differentiator 64, KP, must be that of time. Of course, it will be appreciated that the signals on the lines 48, 50, 68, and 70 of FIG. 2 correspond, respectively, to similar signals 26, 28, 24, and 18 of FIG. 1.

The synchrophaser 16 of FIG. 2 has certain limitations due chiefly to nonlineraties which are present in the pitch control system. Because of these nonlinearities, small signal variations in the speed reference signal induced by the synchrophaser will be met by no response until the propeller speed referenced bias on the line 58 provides sufficient signal magnitude to pass through the hysteresis band of the pitch control 46. Once the propeller speed reference bias reaches a significant level, outside the hysteresis or dead band of the pitch control system, the pitch control will act to change the pitch of the slave propeller in the desired direction. Once the phase correction is made, the slave speed must be restored to correspond to the master so that the phase relationship is maintained. However, the propeller speed reference integrator has by then integrated to a value which though speeding up or slowing down the slave to make the phase correction, also has the effect of causing overshooting of the correct phase position until the phase error grows, in the opposite direction, to a value outside the other side of the hysteresis band of the propeller control. This results in a limit-cycling type phenomenon which has resulted in an observed phase error of as much as 12° in the prior art. This limit-cycling problem has been attacked in the prior art by imposing a "dither" signal onto the speed command signal. The frequency of the dither signal is higher than the frequency response of the pitch control system and results in a constant jittery type action in the actuator. This "dither" serves to keep the actuator moving so as to provide an average propeller pitch which oscillates about the desired operating point. However, although this approach significantly narrows the dead band so that the phase error variation is on the order of between 3° and 4°, the actuator in the pitch control system may experience an unsatisfactory degree of wear.

Referring back to FIG. 1, it is a central teaching of the present invention, that the limit-cycling problem of the prior art may be substantially reduced by adding an engine power reference bias control 12 to the synchrophaser of the prior art. Whenever the pitch control system 46 is in its dead band, i.e., whenever small signal variations in the referenced speed command signal on the line 45 are ineffectual because of the hysteresis present in the pitch control servo actuator, the synchrophaser 10, according to the present invention, provides a bias signal on a line 80 to be added to a power reference signal on a line 82 in a junction 86 which in turn provides a referenced power command signal on a line 90 to an engine power control (fuel control) 92 where it acts to change the power level slightly thereby changing propeller speed and correcting the phase error. Usually this is accomplished by means of a fuel control 92 which provides a varying amount of fuel on a line 94 to a slave engine 96 which mechanically drives the slave propeller 22 as indicated by a mechanical coupling 98. A generalized engine power sensor 100, for example a gas generator speed sensor, provides a sensed power signal on a line 102 indicative of the output power of the slave engine 96 to the fuel control 92. The sensed signal on the 102 is compared within the fuel control to the referenced command signal on the line 90 and the amount of fuel is varied according to the difference therebetween.

Since it is normally a requirement of multi-engine aircraft that the engines all be running at the same power level, it is necessary to limit the variations in fuel supplied as a result of changes in the power reference bias signal on the line 80. Thus, the engine power reference bias control 12 includes means for limiting the magnitude of the signal on the line 80 to a level which will induce changes in propeller speed which would only narrowly correspond to the magnitude of changes which would be desired within the hysteresis band of the pitch control 46. In other words, the authority of the engine power reference bias control 12 is limited to inducing changes in propeller speed only approximately as large as the dead zone of the pitch control 46. In this way, phase errors in propeller position may be more effectively corrected by a combination of pitch control for "macro" speed control and engine power control for "micro" propeller speed control.

Figure 3:
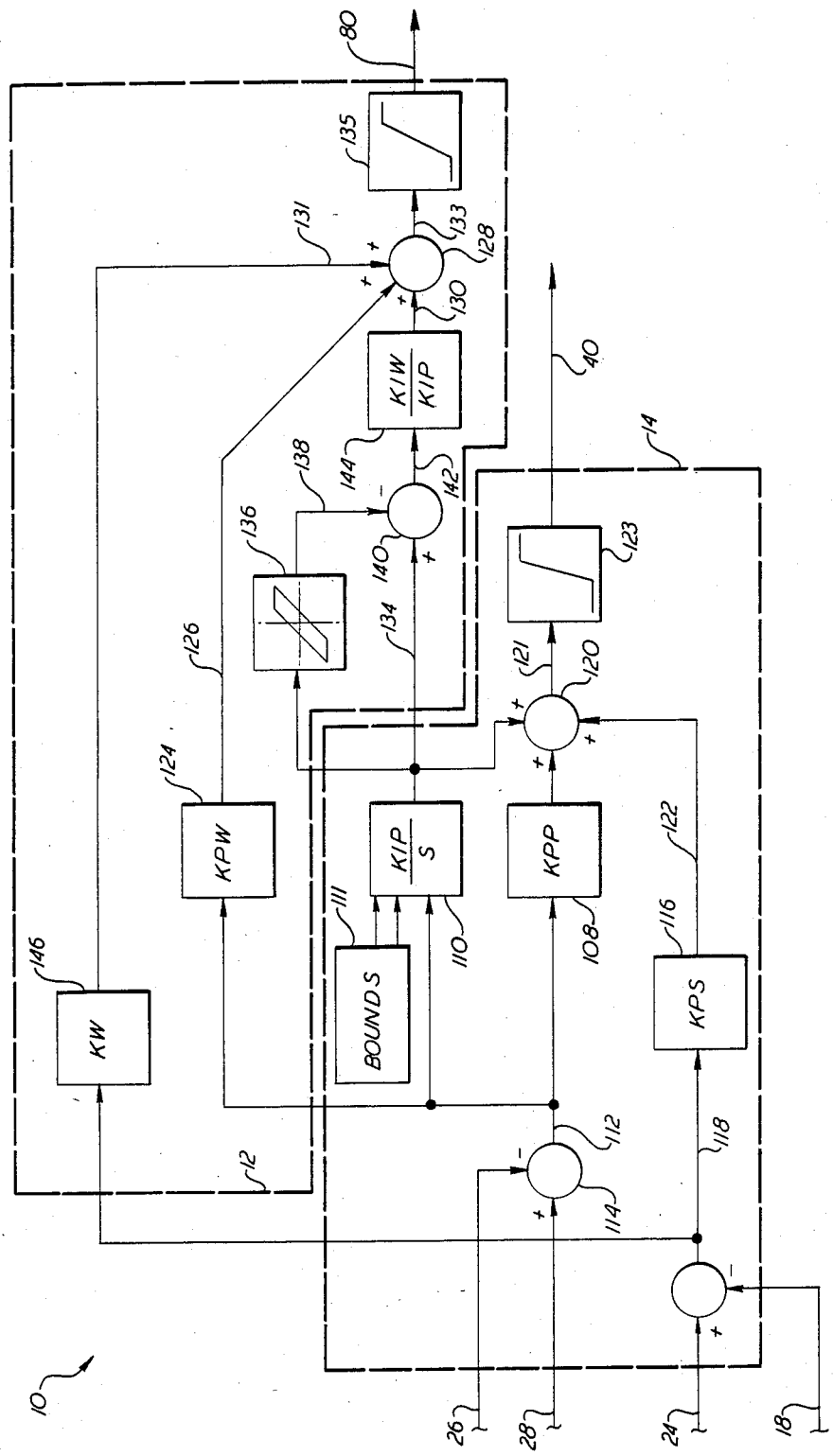
FIG. 3 is a more detailed block diagram illustration of the improved propeller synchrophaser of FIG. 1, according to the present invention.

FIG. 3 is a more detailed illustration of an embodiment of the synchrophaser 10 of FIG. 1 according to the teachings of the present invention. The speed reference bias control 14 includes elements which may be very similar to the speed reference bias control 16 of FIG. 2. These may include a proportional gain 108, an integrator 110, and integrator bounds 111 forming a proportional-plus-integral control similar to the control 56 of FIG. 2. The proportional-plus-integral control of FIG. 3 is responsive to a phase error signal on a line 112 which is derived from a summing junction 114 responsive to the phase difference signal of FIG. 1 on the line 28 and the phase difference reference signal on the line 26. Similarly, the speed reference bias control circuit 14 of FIG. 3 also includes a differentiator 116 similar to that of FIG. 2 responsive to a speed difference signal on a line 118 indicative of the difference in magnitudes between the sensed master and slave speed signals on the lines 24 and 18, respectively, of FIG. 1. The proportional-plus-integral signal is summed in a junction 120 with a signal on a line 122 from the differentiator 116 indicative of the rate at which the sensed speed difference between the master and slave propellers is changing, providing a signal on a line 121. The magnitude of the signal on the line 121 is bounded by a limiter 123 to yield the speed reference bias signal on the line 40.

The referenced phase error signal on the line 112 is provided, according to the present invention, to the engine power reference bias control 12 and is used for proportional control by multiplying the error signal by a proportional gain 124 which provides a phase error signal on a line 126 to a summing junction 128 where it is summed with a limited and scaled integral signal on a line 130 and an acceleration signal on a line 131 to provide a signal on a line 133. The magnitude of the signal on line 133 is bounded by a limiter 135 to provide an engine power bias signal on a line 80. The output from the same integrator 110 used for the proportional-plus-integral control of the speed reference bias control may also be advantageously utilized, according to the present invention, in the engine power reference bias control 12. This may be accomplished by taking the same integrated output signal on a line 134 from the integrator 110 and ultimately combining it with the proportional signal on the line 126. However, before providing the desired proportional-plus-integral control, the integrated signal on the line 134 must be limited by a hysteresis transfer function 136 which provides a signal on a line 138 which is subtracted in a junction 140 from the integrated signal on the line 134. The junction 140 provides a limited integrated signal on a line 142 which keeps the amount of speed control authority effected by the engine power variations within a narrow band centered around the current speed operating point. The signal on the line 142 is scaled in a proportional gain 144 and the resulting signal on the line 130 is summed in the junction 128 as described previously. The acceleration signal on the line 131 is provided by a proportional gain 146 responsive to the speed error signal on the line 118. The time dimensions of the gains used in the engine power reference bias control elements include a dimensionless KW, inverse time for KPW, and a dimensionless KIW/KIP. The hysteresis transfer function is dimensionless.

As a typical example of the operation of the circuit of FIG. 3, the signal on the line 134 may be thought of as initially increasing in one direction. The signal on the line 138 will remain unchanged until the signal on the line 134 increases by an amount greater than the hysteresis band of the transfer function 136. It will then increase at the same rate as the signal on line 134. Since the signal on line 142 is the signal on line 138 subtracted from the signal on line 134, it increases at the same rate as the signal on line 134 until the signal on line 138 begins to increase, thereby causing the signal on line 142 to remain at a constant value equal to the amount of hysteresis. As the signal on line 134 increases in one direction, the pitch control 46 of FIG. 1 remains nonresponsive until the signal on line 134 increases by an amount greater than its hysteresis band magnitude and will then respond at a rate proportional to the rate increase of the signal on line 134. The magnitude of the total hysteresis band of the transfer function 136 is selected to be comparably less than the magnitude of the hysteresis band of the pitch control 46. Therefore, a comparison of the pitch control response and the output signal on the line 142 shows that the signal on the line 142 increases as the signal on line 134 increases while the pitch control response remains unchanged. However, after the signal on the line 142 stops increasing, due to the subtraction of the signal on line 138 from the signal on line 134, then the pitch control begins to respond as the signal on line 134 continues to increase because the signal on line 134 has increased by an amount greater than the hysteresis band magnitude of the actuator 46. This means that control has changed from the engine power reference bias control 12 initially to the propeller speed reference bias control 14, subsequently. As the signal on line 134 changes direction and begins to decrease, the signal on line 142 begins to decrease at the same time because the signal on line 138 remains constant due to the hysteresis transfer function 136 while the pitch control response remains constant due to the hysteresis band of the actuator 46. Therefore, control is then effectively switched from the propeller speed reference bias control 14 back to the engine power reference bias control 12 when the signal on line 134 changes direction. If the absolute value of the signal variation on line 134 becomes much larger than the total hysteresis magnitude of the actuator 46, then control is essentially determined by the propeller speed reference bias control 14. However, if the signal variation on line 134 is smaller than the total hysteresis magnitude of the transfer function 136, then the engine power reference bias control 12 will have sole control while the actuator 46 response remains constant. Thus, the engine power reference 80 bias control 12 acts as a small amplitude signal integrator limited by the total hysteresis magnitude of the transfer function 136 and the propeller speed reference bias control 14 acts as a large amplitude signal integrator limited by the integrator bounds 111.

It will be apparent to those skilled in the art that the simplified schematic block diagram illustration of FIGS. 1 and 3 may be implemented using dedicated analog or digital hardware, or may be implemented using a general purpose digital computer executing logical steps dictated by the teachings of the present invention as disclosed herein.

Although the invention has been shown and described with respect to a best mode embodiment thereof, it should be understood by skilled in the art that the foregoing and various other changes, omissions and deletions in the form and detail thereof may be made therein without departing from the spirit and scope of this invention.

We claim:

1. A slave synchrophaser (10) for an aircraft having a master propeller and at least one slave propeller, each slave having an empirically determined optimum phase relation to the master, said slave synchrophaser comprising:

first control means (14), responsive to a phase error signal (112) having a magnitude indicative of the difference between a phase difference signal (28) indicative of a sensed phase difference between the master propeller and the slave propeller, and a phase difference signal (26) indicative of a selected phase difference between a master propeller and a slave propeller, for providing a speed reference bias signal (40) for biasing a speed reference signal (43) for the slave propeller's speed governor (46); and second control means (12), responsive to said phase error signal (112) for providing an engine power bias signal (80) for biasing a power reference signal (82) for the slave propeller's engine power controller (92), the magnitude of said engine power bias signal (80) being limited to provide a power change in the slave engine (96) which causes a speed change in the slave propeller (22) only within the small signal speed command signal hysteresis response band of the slave propeller's speed governor (46).

2. The synchophaser of claim 1, wherein said first control means comprises a proportional plus integral control.

3. The synchrophaser of claim 1, wherein said second control means comprises a proportional plus integral control.

4. The synchrophaser of claim 1, wherein both said first and second control means comprise proportional plus integral control.

5. The synchrophaser of claim 4, wherein said first and second means share said integral (110) control commonly.

6. The synchrophaser of claim 3, further comprising auxiliary proportional control means (146), responsive to a speed difference signal (118) indicative of the sensed difference between the master propeller and the slave propeller for providing a signal (131) indicative of the rate of change in phase difference between the master and slave and having a magnitude proportional to said speed difference signal, said synchrophaser summing (128) said proportional difference signal with a limited proportional (126)-plus-integral (130) signal to provide said engine power bias signal (80).

7. The synchrophaser of claim 2, further comprising a differentiator (116), responsive to a speed difference signal (118) indicative of the sensed speed difference between the master propeller and the slave propeller for providing a derivative signal (122) proportional to the rate at which the sensed speed difference is changing, said synchrophaser summing (120) said derivative signal with a proportional-plus-integral signal to provide said speed reference bias signal (40).

* * * * *